United States Patent [19]

Termuehlen et al.

[11] Patent Number: 5,267,434
[45] Date of Patent: Dec. 7, 1993

[54] GAS TURINE TOPPED STEAM PLANT

[75] Inventors: Heinz Termuehlen, Sarasota, Fla.; Jerry Saddler, St. Louis, Mo.; Hermann Brueckner, Uttenreuth; Dietmar Bergmann, Mulheim an der Ruhr, both of Fed. Rep. of Germany

[73] Assignee: Siemens Power Corporation, Palmetto, Fla.

[21] Appl. No.: 868,607

[22] Filed: Apr. 14, 1992

[51] Int. Cl.$^5$ .............................. F02C 6/18
[52] U.S. Cl. .................. 60/39.182; 122/7 R
[58] Field of Search ............ 60/39.181, 39.182; 122/7 R, 7 B

[56] References Cited

U.S. PATENT DOCUMENTS

| | | | |
|---|---|---|---|
| 2,604,755 | 7/1952 | Nordstrom et al. | 60/39.182 |
| 2,946,187 | 7/1960 | Zoschah et al. | 60/39.182 |
| 3,314,231 | 4/1967 | Hochmuth | 60/39.181 |
| 4,572,110 | 2/1986 | Haeflich | 122/7 R |

Primary Examiner—Louis J. Casaregola
Attorney, Agent, or Firm—Ira Lee Zebrak

[57] ABSTRACT

A gas turbine topped onto two or more steam turbine plants having therebetween a heat recovery heat exchanger comprising two side-by-side, but separate, ducts is disclosed. Each of the ducts comprises heat exchange means for each of the respective steam turbines. The hot exhaust gases from a gas turbine are passed in heat exchange with heat exchange means for each of steam turbine. Damper means for controlling the amount of hot exhaust gas passing into the respective heat exchange means for each steam turbine are also disclosed. In another embodiment of the invention, separate damper means for each of said respective heat exchange means for varying the amount of hot exhaust gas between each of said heat exchange means are provided. The inventive system provides high plant efficiency and excellent operating flexibility.

19 Claims, 7 Drawing Sheets

GAS TURINE TOPPED STEAM PLANT

BACKGROUND OF THE INVENTION

This invention pertains to a topping arrangement of two or more steam turbine plants with a gas turbine.

Combined cycle units with heat recovery steam generators (HRSG's) as well as combined cycle plants with fully-fired steam generators are known. As a result, a variety of combined cycle arrangements based on simple plant power concepts have been developed. Thus, combined cycle plants with fully fired steam generators have been in operation as early as 1965. The gas turbines for these plant concepts are equipped with a heat recovery steam generator or heat exchanger utilizing the gas turbine exhaust energy to provide additional main steam, reheat steam or feedwater heating for steam plants, thereby increasing their output and overall power plant efficiency. These power plant concepts designated as compound cycles can be adopted for new facilities, but are especially suitable for repowering or topping projects. Since only a minimum of new steam plant equipment is needed, these plant concepts can become attractive low cost projects. See Maghon, H., Bermann, D., Brückner, H., Kriesten, W., and Termuehlen. "Combined Cycle Power Plants for Load Cycling Duties" American Power Conference, Chicago, Ill., April 1989; Kreutzer, A., Ganzer, W., and Termuehlen, H., "Gas and Coal-Fired Combined Cycle Plants" American Power Conference, Chicago, Ill., April 1986; and Denizci, H., and Hamann, B., "Design and Operation of Ambarli Combined Cycle Power Plant" AEIC, Committee on Power Generation, Sep. 1991.

The largest plant built with a fully fired steam generator, also known as a "hot wind box" design is in Germany. It features four 417 MW size units and one 700 MW unit providing a net plant output of 2300 MW. The 770 MW unit features a coal-fired steam generator with a desulfurization system. Since the reliability of the previously installed gas turbines has been outstanding, it was decided to provide only 60% forced draft (FD) fan capacity for the operation of the steam plant without gas turbine, reducing the output for this mode of operation from 656 MW to roughly 500 MW. In the normal combined cycle operating mode, the gas turbine exhaust is supplied as preheated air with about 16% oxygen to the steam generator and its coal mills. A cooling air fan provides air to control the temperature in the mills and for FD-fan operation a primary air heater is installed. A partial-flow economizer provides feedwater heating in parallel to the HP feedwater heaters of the steam plant.

The fully-fired concept has also been applied for repowering a 590 MW power station. See Maghon, H., Schulenburg, T., Laakkonen, M., Froehlich, G., and Termuehlen H., "Full-Load Testing of the Advanced V64.3 Gas Turbine" American Power Conference, Chicago, Ill. April 1991. A V94.2 gas turbine has been installed and an auxiliary FD-fan was provided to achieve maximum output in the combined cycle operating mode with the two original larger FD-fans being only used for back-up operation, without the gas turbine. A flue gas bypass is provided for partial load operation of the steam plant to reduce the hot air supply to the furnace. HP and LP partial flow economizers are used in parallel to the HP and LP feedwater heaters to further improve the overall plant efficiency which was measured to be 46.6% or 7320 Btu/kWh at rated output. Comparing this performance with the original reheat steam plant efficiency of 40.7% (8,380 Btu/kWh) reveals a plant performance improvement of 5.9 percent points or 1,060 Btu/kWh. Load cycling operation between 100% and 45% plant output can be performed without plant efficiency deterioration. The $NO_x$ emission of the power plant was reduced to 30% of the original level from 400-500 ppm to 100-150 ppm at 3% oxygen content of the steam generator's stack flue gas.

SUMMARY OF THE INVENTION

New alternatives are required for utilities in need for peaking capacity or a combination of base load, mid-range load, and peaking capacity. We have discovered that this can be provided in a compound cycle plant comprising a topping arrangement of a gas turbine onto two or more steam turbine plants. This system provides high plant efficiency and excellent operating flexibility.

The apparatus of the invention comprises a gas turbine topped onto two or more steam turbine plants having therebetween a heat recovery heat exchanger comprising two side-by-side, but separate, ducts. Each of the ducts comprises heat exchange means for each of the respective steam turbines.

In accordance with the invention, the hot exhaust gases from a gas turbine are passed in heat exchange with heat exchange means for each of a steam turbine. The invention further comprises damper means for controlling the amount of hot exhaust gas passing into the respective heat exchange means for each steam turbine. In another embodiment of the invention, separate damper means for each of said respective heat exchange means for varying the amount of hot exhaust gas between each of said heat exchange means are provided.

DESCRIPTION OF THE PREFERRED EMBODIMENT

Figure 1:
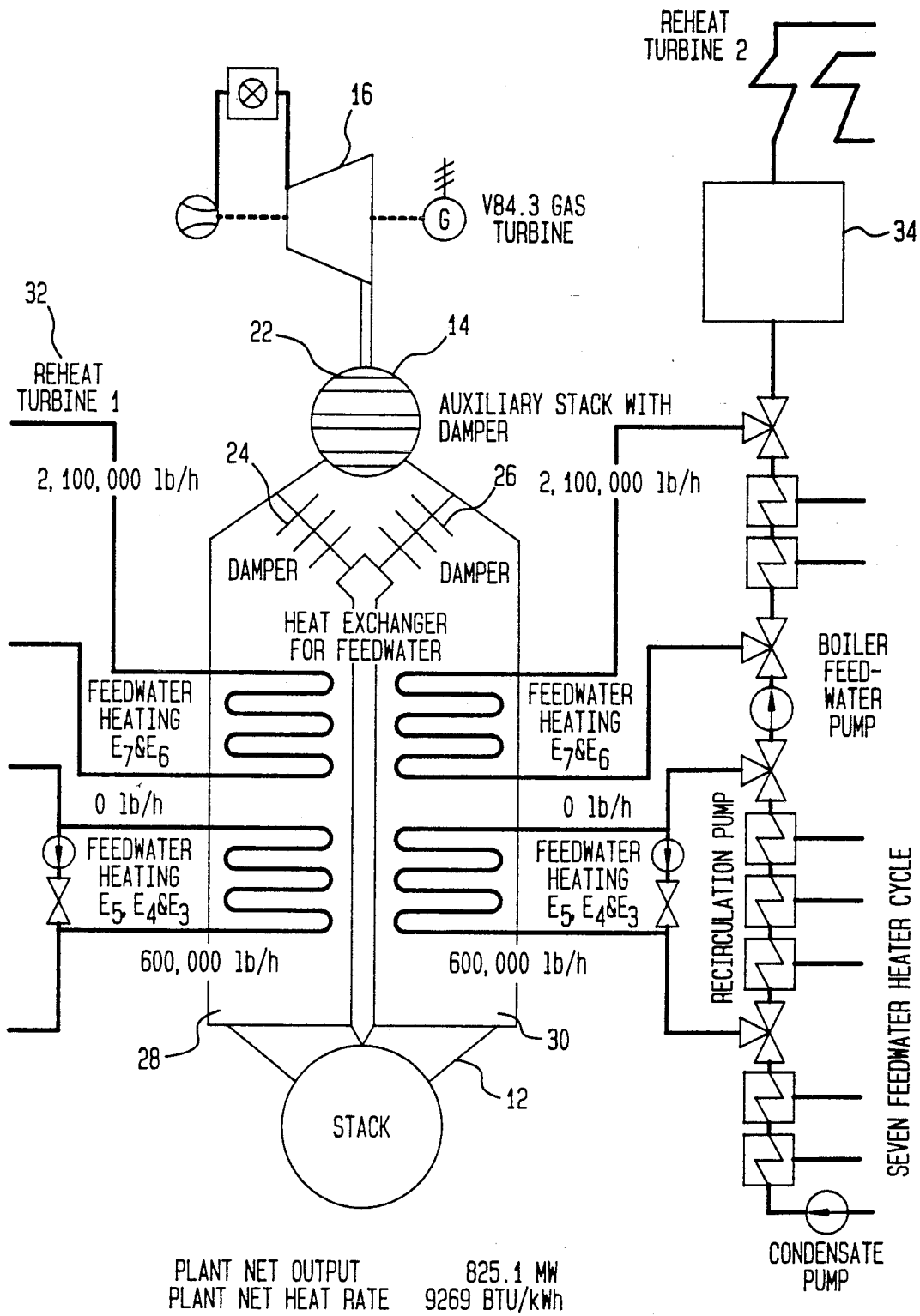
FIG. 1 is a schematic drawing of a gas turbine topped steam turbine arrangement in accordance with the present invention.

The following examples illustrate the invention:

EXAMPLE 1

Compound Cycle Topping with Two Steam Turbine Units with One Gas Turbine

As a basis, two identical 300 MW size reheat steam units were chosen to closely reflect an actual application. It was further assumed that the steam turbines were designed for a larger reheat steam flow, typically required for operation with the top heater out of service.

A maximum output of 326.8 MW per unit is generated when operating with the valves wide open and a 5% overpressure. The plant net performance was evaluated to be:

TABLE 1

| Output | Rated | Maximum |
|---|---|---|
| Turbine-Generator | 312.2 MW | 326.8 MW |
| Auxiliary Load | 15 MW | 26 MW |
| Plant Output | 297.2 MW | 310.8 MW |
| Turbine-Generator Heat Rate | 7731 Btu/kWh | 7709 Btu/kWh |
| Plant Net Heat Rate | 9904 Btu/kWh | 9885 Btu/kWh |

Turbine-Generator Heat Rate based on Low Heat Value Plant
Heat Rate based on High Heat Value For this application, it was found that the potential output increase can best be achieved when applying one V84.3 gas turbine to provide feedwater heating or reheat steam for both units in a compound cycle mode the V84.3 gas turbine performance for base and peak capacity is at 59° F. ambient temperature the following:

TABLE 2

| Load | Base | Peak |
|---|---|---|
| Net Output | 135.5 MW | 145.9 MW |
| Heat Rate Based on Low Heat Value | 9767 Btu/kWh | 9668 Btu/kWh |
| Heat Rate Based on High Heat Value | 10,838 Btu/kWh | 10,728 Btu/kWh |

The original plant net heat rate of 9554 Btu/kWh has been improved for both reheat steam units to 9048 Btu/kWh with only the one gas turbine being installed. The rated output was increased by:

| | |
|---|---|
| One Gas Turbine Output | 135.5 MW |
| Additional Output Increase of Steam Plants | 2 × 27.1 MW |
| Total Output Gain | 189.7 MW |

The maximum plant output increased, when operating the gas turbine at peak-load capacity with a heat rate level of 9008 Btu/kWh, as follows:

| | |
|---|---|
| One Gas Turbine Output | 145.9 MW |
| Additional Output Increase of Steam Plants | 2 × 28.8 MW |
| Total Output Gain | 203.5 MW |

The maximum performance for adding one V84.3 gas turbine generator as a simple cycle peaking unit to the system compared to building a completely new combined cycle plant or a compound cycle arrangement is shown in the following three equations.

| Addition of a Simple Cycle V84.3 Plant | | |
|---|---|---|
| Steam Turbine Plant | 2 × 310.8 MW | 9885 Btu/kWh |
| Gas Turbine Plant | 1 × 148 MW | 10570 Btu/kWh |
| Total Plant | 769.8 MW | 10017 Btu/kWh |
| Addition of a Combined Cycle V84.3 Plant | | |
| Steam Turbine Plant | 2 × 310.8 MW | 9885 Btu/kWh |
| Gas Turbine Plant | 1 × 221 MW | 7070 Btu/kWh |
| Total Plant | 842.6 MW | 9147 Btu/kWh |
| Addition of a Compound Cycle V84.3 Plant | | |
| Steam Turbine Plant | 2 × 339.6 MW | 8955 Btu/kWh |
| Gas Turbine Plant | 1 × 145.9 MW | 10728 Btu/kWh |
| Total Plant | 825.1 MW | 9269 Btu/kWh |

The higher gas turbine output for the simple cycle application is the result of smaller outlet pressure losses.

Summarizing these results leads to the following improvements of performance for adding combined cycle or compound cycle units versus adding a simple cycle gas turbine unit:

TABLE 3

| Total Plant Net Performance | | Simple Cycle | Combined Cycle | Compound Cycle |
|---|---|---|---|---|
| Output | MW | 769.6 | 842.6 | 825.1 |
| Output Increase | MW Bawe | | 73.0 | 55.0 |
| | % Base | | 9.5 | 7.2 |
| Heat Rate | Btu/kWh | 10017 | 9147 | 9269 |
| Improvement | Btu/kWh Base | | 870 | 748 |
| | % Base | | 8.7 | 7.5 |

The smaller increase in output and decrease in heat rate for the compound cycle versus the combined cycle is mainly a result of increased losses in the steam turbines' LP sections. By replacing these parts of the existing steam turbines the output gain and heat rate performance for the compound cycle can be further improved.

For selecting an optimal repowering concept for this unique compound cycle application, we investigated this and three more cycle concepts.

EXAMPLE 2

Alternative I

Feedwater Heating for a Plurality of Extractions

The V84.3 gas turbine exhaust energy is matching the required heat for the two HP heaters' feedwater heating capacity of both reheat steam plants as well as partial feedwater heating in parallel to the LP extractions. The feedwater inlet temperature of 180° F. for extraction 3 matches the stack gas temperature of 200° F., which provides an optimal overall performance. During steam plant partial load operation recirculation can be used to keep the feedwater temperature at about 180° F. With the available exhaust energy from the gas turbine, a final feedwater temperature of 491° F. was achieved. The maximum plant net was increased as follows:

TABLE 4

| | Reheat Plant | Compound Cycle |
|---|---|---|
| Steam Plant Output | 2 × 326.8 MW | 2 × 355.6 MW |
| Gas Turbine Output | 0 MW | 1 × 145.9 MW |
| Total Output | 653.6 MW | 857.1 MW |
| Auxiliary Power | 2 × 16 MW | 2 × 16 MW |
| Plant Net Output | 621.6 MW | 825.1 MW |
| Plant Net Output Increase | | 203.5 MW |

The arrangement provides this capacity increase at an attractive heat rate improvement of 616 Btu/kWh or 6.2%. This improvement over the reheat steam plant performance is very attractive and is a result of optimal utilization of the gas turbine exhaust energy at a high energy level.

Full-load operation of the gas turbine and partial-load operation of the steam plants might be limited by the final feedwater temperature reaching a level at which boiling in the reheat steam boilers' economizers could occur. For controlling such operational modes, the heat exchanger is of a special design, shown in FIG. 1, providing extremely high operating flexibility.

The dual-duct design of the heat recovery heat exchanger 12 permits any mode of operation of the one gas turbine and two steam plants. An auxiliary stack 14 is provided to operate the gas turbine 16 without the steam plants 18 and 20, since flue gas flows are controlled by three multiple-louver dampers 22, 24, and 26. The two dampers 24 and 26 upstream of the heat exchangers 28 and 30 for the two steam plants 32 and 34 provide independent flow and, in turn temperature control for each of these units. With this arrangement, Operating the gas turbine and only one steam plant is possible. This system also allows start-up of one unit with the other steam plant already in full operation.

Figure 2A:
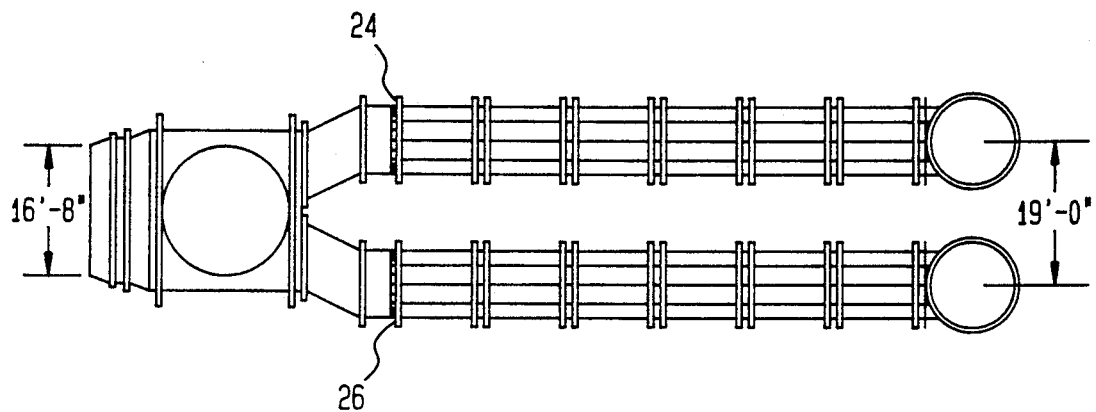
FIGS. 2(A) and 2(B) are side and top views of a heat exchanger in accordance with the present invention.
Figure 2B:
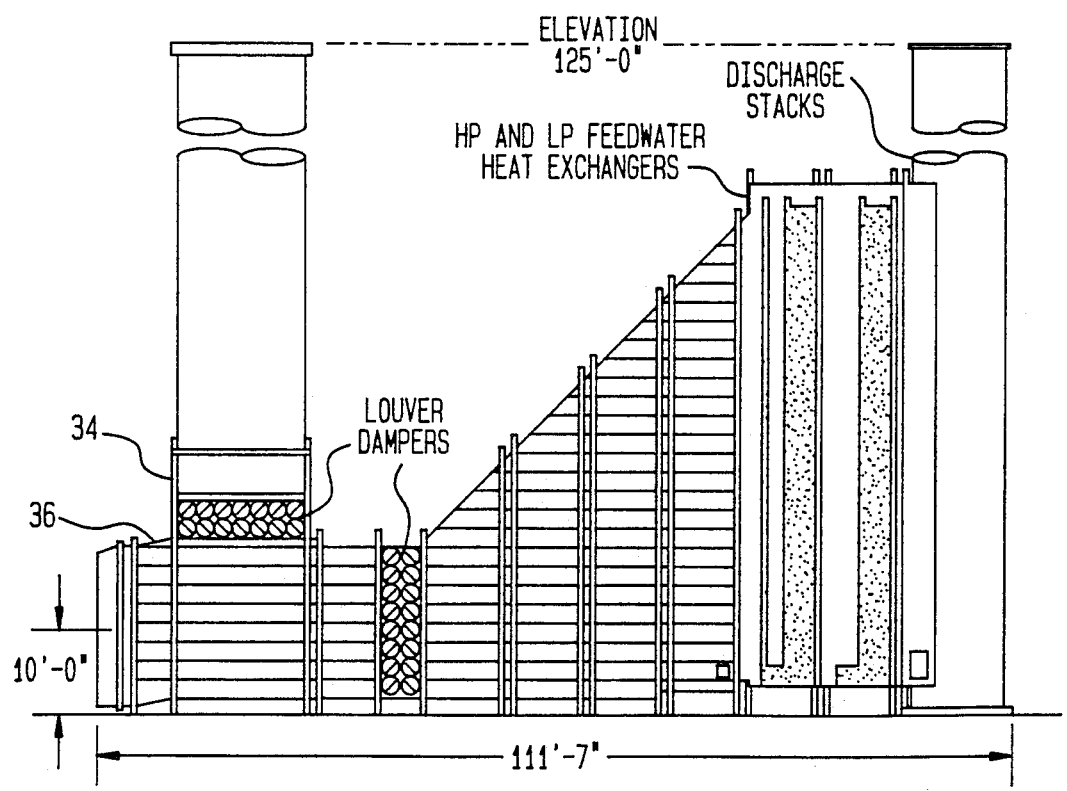
Figure 3:
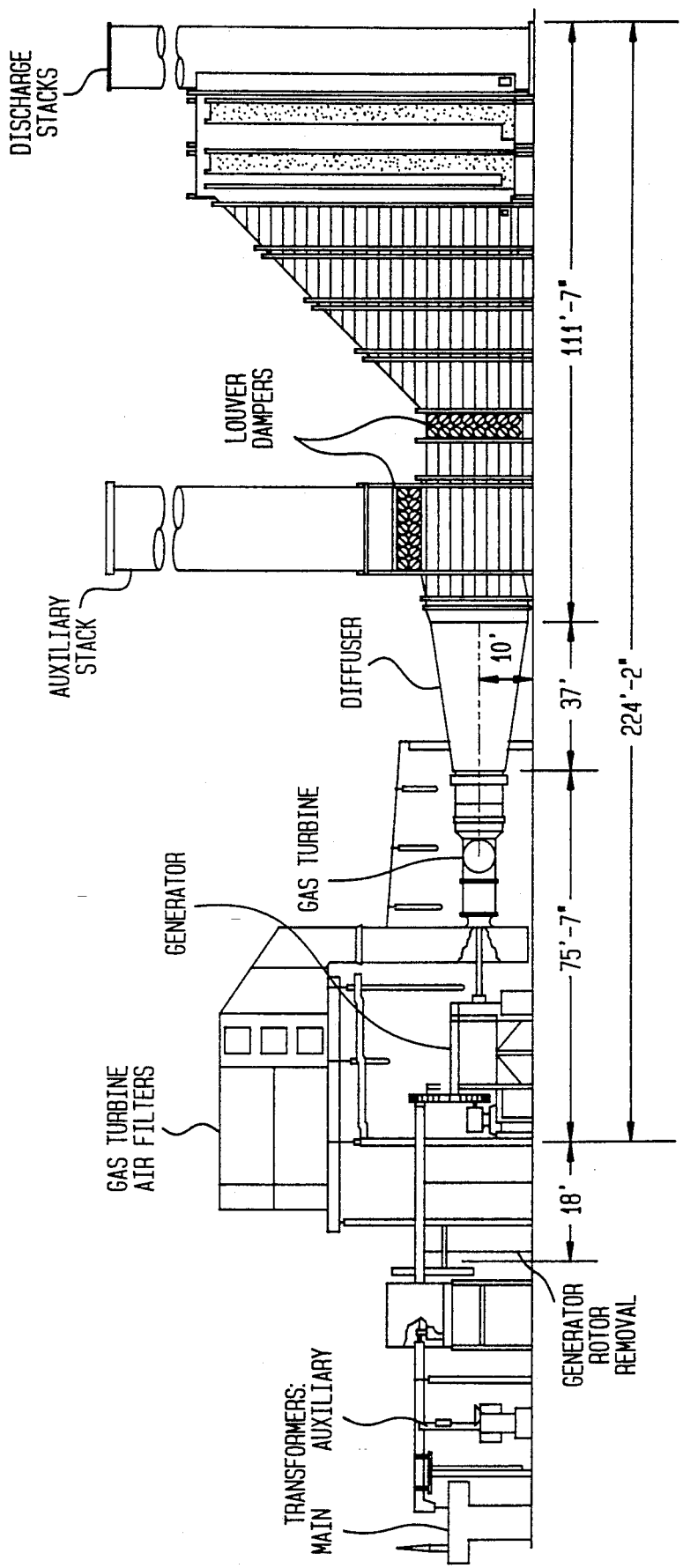
FIG. 3 is a side view of a gas turbine-generator with a heat exchanger for feed water preheating in accordance with the present invention.

The detailed design of the heat exchanger 12 for the feedwater preheating is illustrated in FIGS. 2 and 3. The gas turbine exhaust enters at first the single gas turbine stack 14. From there, the gas flow is equally split into channels leading to two independent HP and LP feedwater heating tube bundles. This dual-channel arrangement has been chosen to operate the two steam plants independently.

This design concept has been developed to provide the highest degrees of operating flexibility. The gas flows are controlled by louver dampers. Two rows of louvers 34 and 36 are installed in the gas turbine auxiliary stack to minimize leakage losses during operation of the HP and LP feedwater heat exchangers. Pressurizing the area between these two rows of louvers eliminates any leakage losses. In front of each heat exchanger section is a single row louver damper 24 and 26 installed to control independently, the gas flow to the HP and LP feedwater heat exchangers. Operating experience with louver dampers in Europe have been very positive. Modulating the three dampers in the auxiliary stack and up stream of the two heat exchanger sections in the proper sequence permits controlling the operations of:
- only the gas turbine
- the gas turbine with one steam turbine unit
- the gas turbine with two steam turbine units
- transfer from and to any of these operation modes
- start-up to all these operating conditions The gas turbine stack for the V84.3 gas turbine shown in FIG. 2 is 18 feet and the two discharge stacks of the heat exchanger sections are 13 feet in diameter. Operation with one steam plant requires partial opening of the auxiliary stack to optimize maximal feedwater heat supply to this unit and a minimum of pressure losses at the gas turbine exhaust.

The arrangement of the heat exchanger with a V84.3 advanced gas turbine is illustrated in FIG. 3. The heat exchanger with its over all length of 111'7" is connected to the axial diffuser of the gas turbine. The overall length of the V84.3 gas turbine with a 165 MVA generator is 75'7". Adding the diffuser length of 37' results in a total length of 224'2" for the entire gas turbine/heat exchanger plant.

As illustrated the advanced V84.3 gas turbines' two combustion chambers are horizontally arranged. The gas turbine air intake at the generator side is extended to the air filters which are mounted above the air-cooled generators. The turbine inclosure width is approximately 64 feet which provides space for auxiliaries and internal maintenance work. The V84.3 gas turbine features 2×6 hybrid burners to provide low $NO_x$ emission without steam or water injections in a premix burning mode. For operation with fuel oil or for power augmentation, steam or water injection is provided.

EXAMPLE 3

Alternative II

Feedwater Heating for Extractions $E_7$ Through $E_3$

Figure 4:
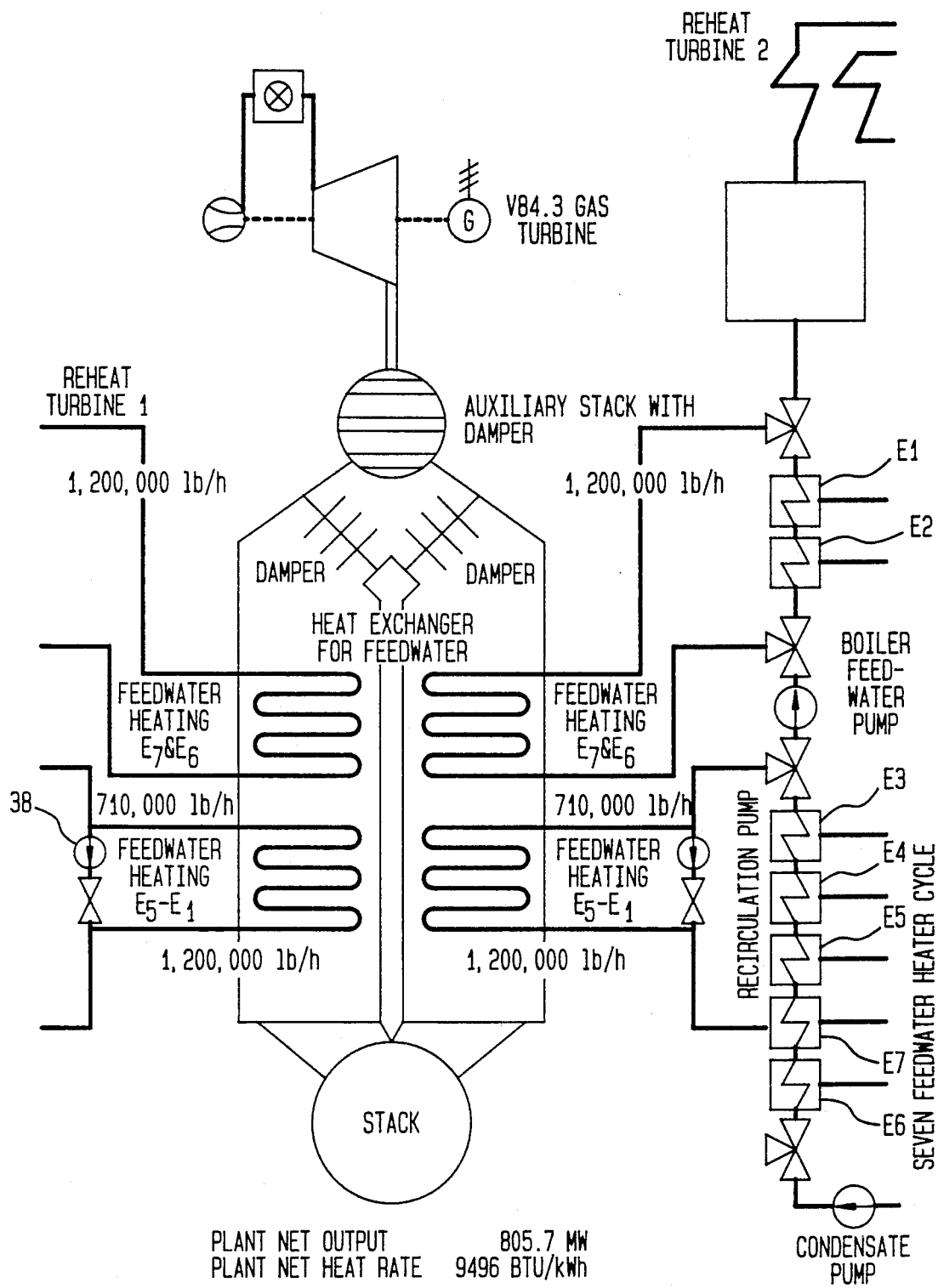
FIG. 4 is a schematic drawing similar to FIG. 1 of another embodiment of the invention.

This cycle shown in FIG. 4, provides the following increase in maximum plant out put at a heat rate improvement of 389 Btu/kWh or 3.9%:

TABLE 5

| | Reheat Plant | Compound Cycle |
|---|---|---|
| Steam Plant Output | 2 × 326.8 MW | 2 × 345.9 MW |
| Gas Turbine Output | 0 MW | 1 × 145.9 MW |
| Total Output | 653.6 MW | 837.7 MW |
| Auxiliary Power | 2 × 16 MW | 2 × 16 MW |
| Plant Net Output | 621.6 MW | 805.7 MW |
| Plant Net Output Increase | | 184.1 MW |

This arrangement with a dual-duct heat exchanger is similar to alternative I, but provides partial feedwater heating for seven feedwater heaters indicated as Extractors E1 through E7. At maximum power plant load, about 57% of the feedwater is preheated by the gas turbine exhaust energy and the remaining 43% by the steam extractions from the steam turbines through their feedwater heaters. This arrangement is not as efficient since the gas turbine discharge energy is not utilized at an elevated level and 109° F. condensate is heated by 200° F. flue gas. To avoid corrosion in the heat exchangers' discharge section, recirculation pumps 38 and 40 are installed for raising the condensate inlet temperature. Partial-load operation of the steam plants without increasing the final feedwater temperature can be performed by simply increasing the feedwater flow through the feedwater heat exchangers.

EXAMPLE 4

Alternative III

Hot Reheat Steam Supply

Figure 5:
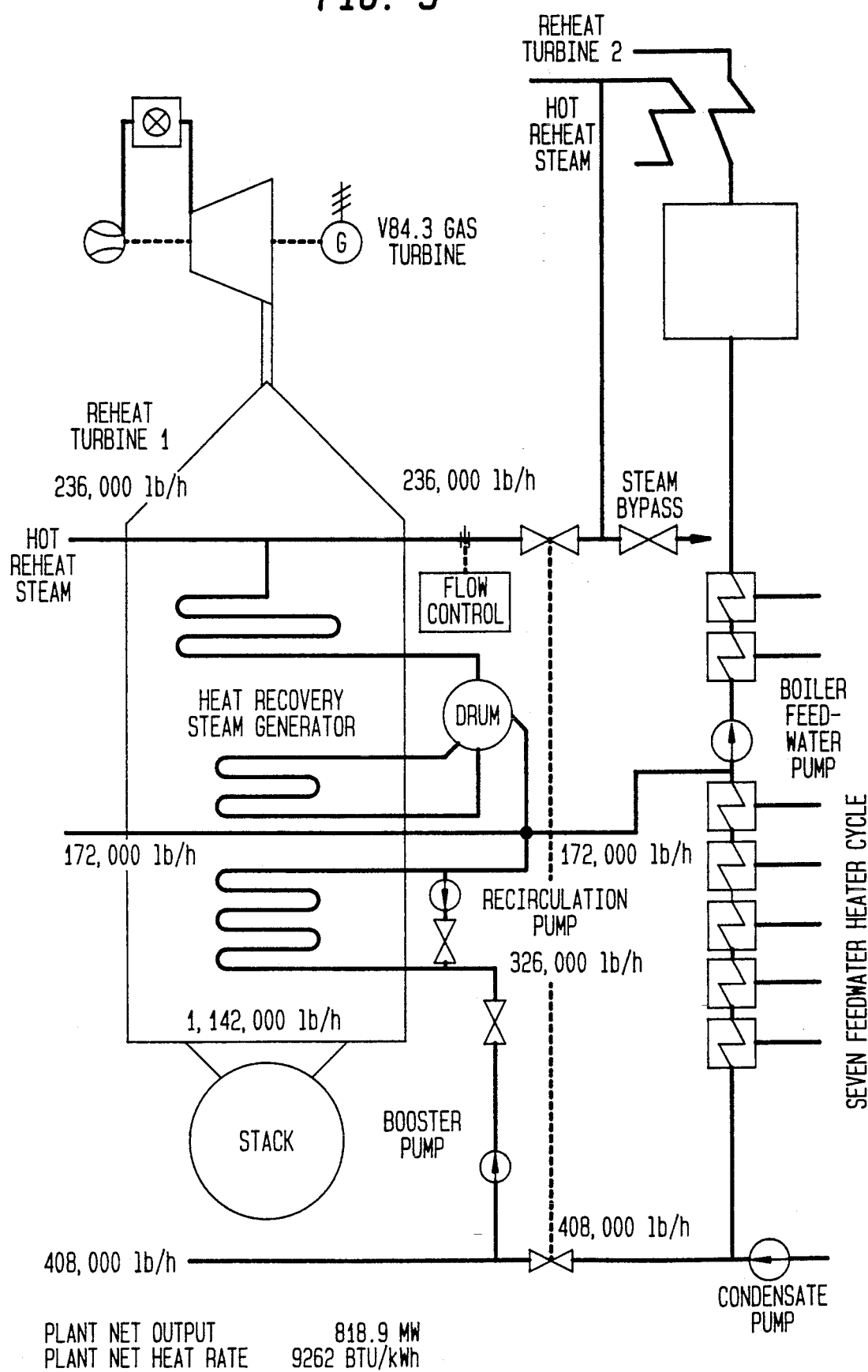
FIG. 5 is a schematic drawing similar to FIG. 1 of yet another embodiment of the invention.

Operation without the top feedwater heater in service basically results in an increase in reheat steam flow and pressure. Instead of utilizing the gas turbine exhaust for feedwater heating, this alternative generates hot reheat steam in the heat recovery steam generator which is then admitted into the reheat steam systems of the steam plants, as illustrated in FIG. 5. The high gas turbine exhaust temperature provides steam with about 1000° F. The compound cycle maximum output increased at an improved heat rate level of 623 Btu/kWh (6.3%) is:

TABLE 6

| | Reheat Plant | Compound Cycle |
|---|---|---|
| Steam Plant Output | 2 × 326.8 MW | 2 × 353.5 MW |
| Gas Turbine Output | 0 MW | 1 × 145.9 MW |
| Total Output | 653.6 MW | 852.9 MW |
| Auxiliary Power | 2 × 16 MW | 2 × 17 MW |
| Plant Net Output | 621.6 MW | 818.9 MW |
| Plant Net Output Increase | | 197.3 MW |

Figure 6:
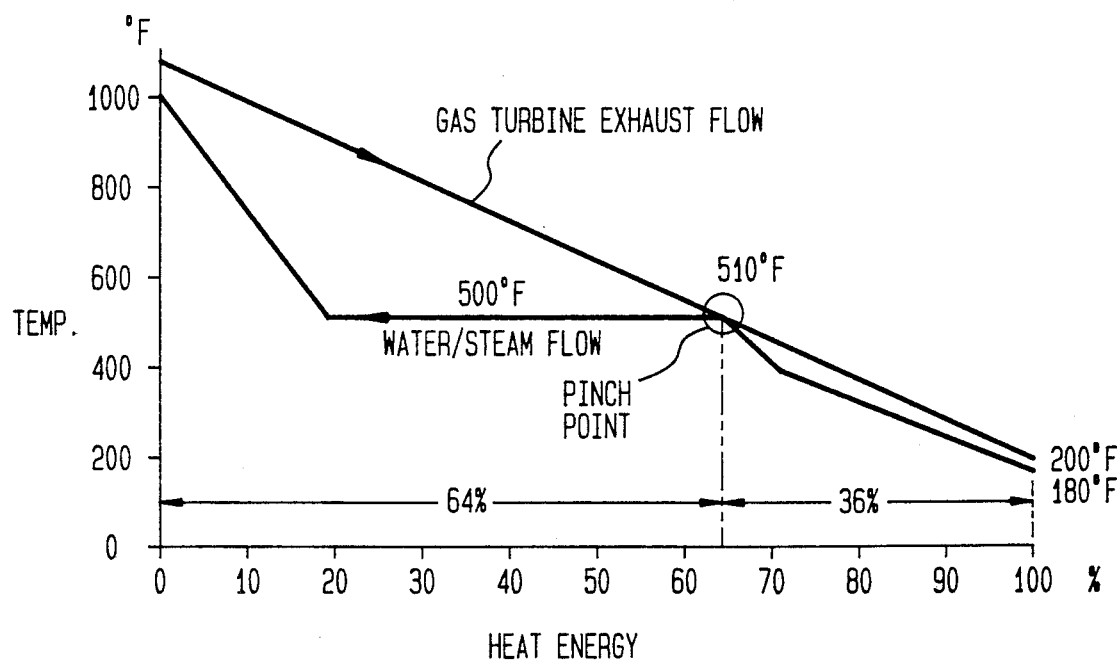
FIG. 6 is a heat energy temperature diagram for the embodiment depicted in FIG. 5.

The heat recovery steam generator receives condensate at 109° F. through a booster pump. The economizer features a recirculation pump to avoid corrosion at the flue gas discharge section. FIG. 6 shows the heat recovery steam generator design criteria. The recirculation provides a condensate inlet temperature of about 180° F. with a correspondent stack gas temperature of 200° F. Roughly 36% of the heat energy is utilized in the two economizer sections. The single-pressure HRSG has a pinch point of 10° F. at a 500° F. temperature level and a temperature difference between produced steam and gas turbine exhaust of about 60° F. The diagram reveals that more steam could be produced if more than 64% of the gas turbines energy would be utilized. Therefore, a lower pressure level (reheat steam pressure of the reheat steam plants) would result in a better overall cycle performance.

The natural circulation section of the HRSG produces hot reheat steam. This relative simple arrangement provides high operating flexibility. The condensate and reheat steam flows from and to the two steam plants are controlled to balance the water and steam supply for the HRSG and the two reheat steam plants. This control concept also permits independent operation of the two reheat steam units. Since no auxiliary stack is provided, gas turbine operation is only possible with at least one steam plant in operation or at partial load with a reduced exhaust temperature. Steam bypass systems are supplied to provide operating flexibility like gas turbine start-up with the steam units operating at full load.

EXAMPLE 5

Alternative IV

Hot Reheat Steam Supply and Feedwater Heating for Multiple Heat Extractions This compound cycle arrangement of a HRSG with feedwater heating provides a greater performance increase than alternative III with a heat rate improvement of 655 Btu/kWh (6.6%) and the following maximum output:

TABLE 4

|                           | Reheat Plant   | Compound Cycle  |
|---------------------------|----------------|-----------------|
| Steam Plant Output        | 2 × 326.8 MW   | 2 × 354.8 MW    |
| Gas Turbine Output        | 0 MW           | 1 × 145.9 MW    |
| Total Output              | 653.6 MW       | 855.5 MW        |
| Auxiliary Power           | 2 × 16 MW      | 2 × 17 MW       |
| Plant Net Output          | 621.6 MW       | 821.5 MW        |
| Plant Net Output Increase |                | 199.9 MS        |

Figure 7:
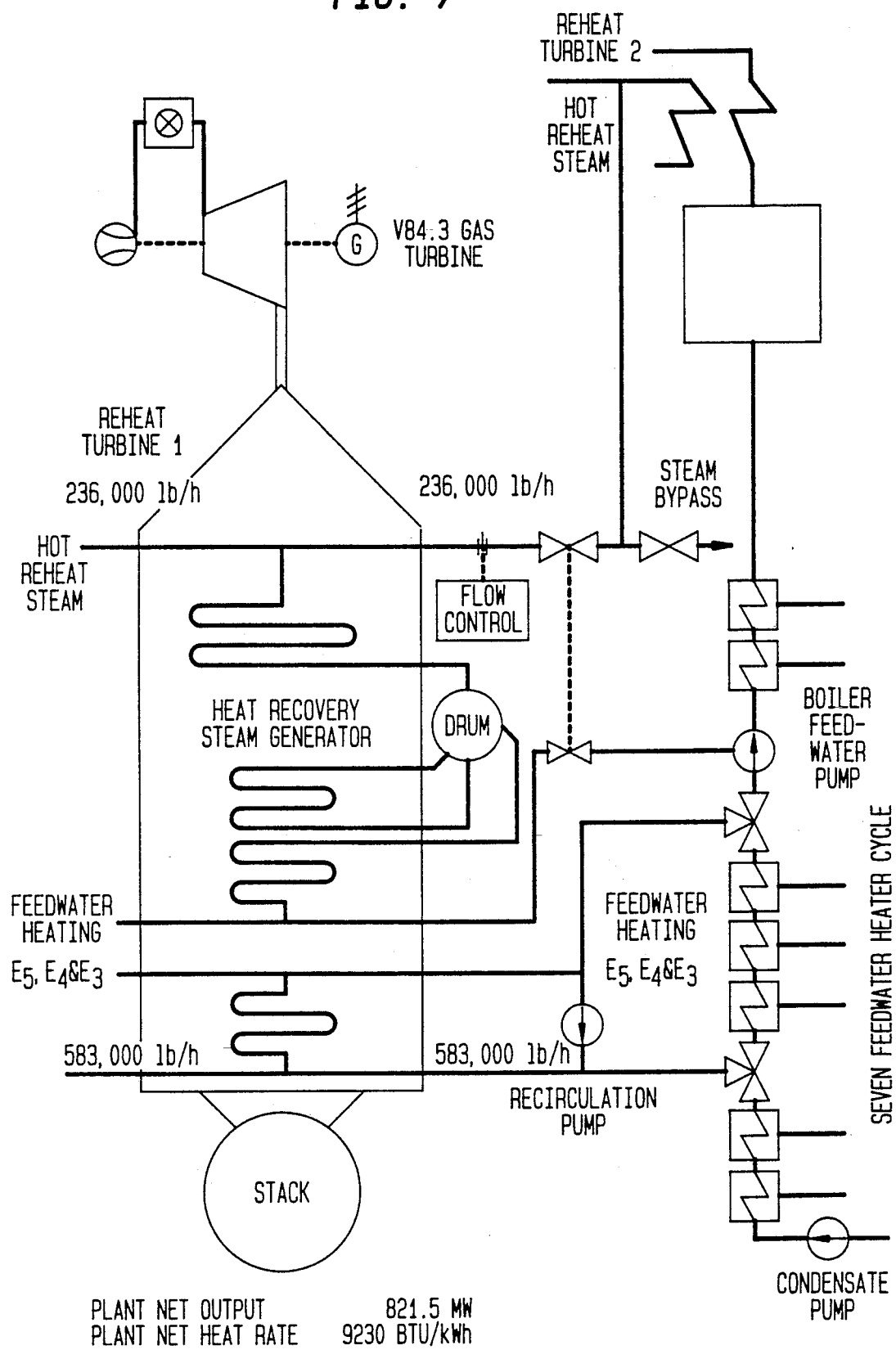
FIG. 7 is a schematic diagram similar to FIG. 1 of yet another embodiment of the invention.

As illustrated in FIG. 7, feedwater preheating is provided for extraction $E_5$, $E_4$ and $E_3$ from the low temperature section of the HRSG. The steam generation section of the HRSG receives feedwater from the steam plants' boiler feedwater pumps. The feedwater and reheat stem flows from and to the two steam plants are controlled as in alternative III.

Besides best performance, the operating flexibility is compatible to alternative III, permitting full-load gas turbine operation with only one steam plant in operation. In cases where the gas turbine to steam turbine output ratio is larger or the reheat pressure is lower, this cycle would become even more efficient because of the increased reheat steam produced at a high energy level.

EVALUATION OF ALTERNATIVES I THROUGH IV

All four alternatives are valid options to be utilized for compound cycle repowering. The two feedwater heat exchanger options seem to be easier to integrate into existing plants, since only feedwater piping connects the gas turbine plant with the steam plants. This pipes's pressure and heat losses are not a major concern. On the other hand, the heat recovery steam generator options provide a slightly better performance improvement. At first, it was thought that the feedwater heat exchangers should be much less expensive than the HRSG's, however, a price comparison considering the use of auxiliary stacks and dampers for the feedwater heat exchanger options raise their cost.

The feedwater heat exchange options provide greater operating flexibility, which is especially important if load cycling and two-shift operation is considered.

In regard to thermal efficiency alternative IV is the best solution, whereas the largest output increase is achieved with alternative I, as listed in Table 8. The larger output increase of alternative I is a result of the increased reheat steam production in the steam plants. The plant net outputs and net heat rates of the various alternatives reveal differences which must be part of a proper evaluation of topping options.

|                                           |         | Present Reheat Steam Plants | Alternative I | Alternative II | Alternative III | Alternative IV |
|-------------------------------------------|---------|-----------------------------|---------------|----------------|-----------------|----------------|
| Gas Turbine Output                        | MW      |                             | 145.9         | 1 × 145.9      | 1 × 145.9       | 1 × 145.9      |
| Steam Plant Output                        | MW      | 2 × 326.8                   | 2 × 355.6     | 2 × 353.9      | 2 × 353.5       | 2 × 354.8      |
| Total Output                              | MW      | 653.6                       | 857.1         | 837.7          | 852.9           | 855.5          |
| Auxiliary Output                          | MW      | 2 × 16                      | 2 × 16        | 2 × 16         | 2 × 17          | 2 × 17         |
| Plant Net Output                          | MW      | 621.6                       | 826.1         | 805.7          | 818.9           | 821.5          |
| Plant Net Heat Rate Based on High Heat Value | Btu/kWh | 9885                        | 9269          | 9496           | 9262            | 9230           |
| Increase in Plant Net Output              | MW      | Base                        | 203.5         | 184.1          | 199.3           | 201.1          |
|                                           | %       | Base                        | 32.7          | 29.6           | 32.1            | 32.4           |
| Improvement in Plant Net Heat Rate        | Btu/kWh | Base                        | 616           | 389            | 623             | 655            |
|                                           | %       | Base                        | 6.2           | 3.9            | 6.3             | 6.6            |

The gas turbine is influenced by differences in outlet pressure loss of the heat exchangers and HRSG's, however, all calculations were performed with 12 inch $H_2O$ because it was assumed that a lower pressure drop in the heat exchangers might be compensated by the use of the auxiliary stack and dampers for these alternatives.

A 165 MVA air-cooled generator has been selected for all alternatives. However, a larger air-cooled generators can be provided for operating at a lower power factor, in case the maximum steam turbine generator capacity is limited and additional reactive power is needed. Presently, air-cooled generator frame sizes up to 260 MVA are available.

The steam turbine-generators were originally designed for the following potential flows:

| Main Steam     | Reheat Steam   | Exhaust Steam  |
|----------------|----------------|----------------|
| 2,100,000 lb/hr | 2,100,000 lb/h | 1,600,000 lb/h |

The maximum steam turbine output in a compound cycle operating mode of 355.6 MW required the following flows.

| Main Steam | Reheat Steam | Exhaust Steam |
|---|---|---|
| 2,100,000 lb/hr | 2,100,000 lb/h | 1,710,000 lb/h |

The exhaust steam flow is the only one which has been increased above its original value. But this increase of only 7% can generally be handled if the steam turbines are not backend loaded or the LP blading is designed for a low mass flow limit. In this case, the LP turbine steam path can be replaced with an advanced design to provide improved performance and a backend loading up to 18,000 lb/ft²h. Such an example is illustrated in Table 9 as alternative IA revealing an addition performance improvement of 16 MW over alternative I for both steam turbines.

TABLE 9

| Total Plant Net Performance | Reheat Plant | Simple Cycle | Combined Cycle HRSG | Compound Cycle Alt I | Compound Cycle Alt IA |
|---|---|---|---|---|---|
| Output MW | 621.6 | 769.6 | 842.6 | 825.1 | 841.1 |
| Output Increase MW | Base | 148 | 221 | 203.5 | 219.5 |
| % | Base | 23.8 | 35.6 | 32.7 | 35.3 |
| Heat Rate Btu/kWh | 9885 | 10017 | 9147 | 9269 | 9093 |
| Heat Rate Btu/kWh | Base | +132 | 738 | 616 | 792 |
| Improvement % | Base | +1.3 | 7.5 | 6.2 | 8.0 |

+ "Worse Heat Rae"

Applying a combined cycle instead of a simple cycle unit reduces the heat rate level of the entire plant by (1.3%+7.5%) 8.8%. This result is based on a combined cycle plant heat rate of 7070 Btu/kWh at HHV and 6370 Btu/kWh at LHV, which accounts for a 53.6% combined cycle plant efficiency. The improvement with the compound cycle alternative I is 7.5% and can be even raised to 9.3% by adding advanced LP turbine replacements. A similar, however, somewhat small improvement can be expected for the combined cycle option when supplying additional LP turbine replacements.

Combined cycle plants with heat recovery steam generators and with fully-fired steam generators as well as compound cycle plants are depending on the circumstance valid alternative for repowering or topping applications. When summarizing our findings for the repowering of two 300 MW steam plants with one advanced gas turbine, the comparison of performance versus the two present reheat units are revealed in Table 8 based on the maximum total power plant net output. Alternative I provides the largest output increase of 32.7% and alternative IV achieves the best heat rate decrease of 6.6%. It should be noted that the evaluation of cycle performance differences is based on a constant main steam flow. A similar study based on constant thermal capacity of the steam plant's steam generators would show a relatively better performance for alternatives III and IV with HRSG's.

Adding a simple cycle gas turbine plant to an existing steam plant increases the weighted heat rate when operating at full-load, however, the total output is increased by the peaking capacity of the gas turbine. Adding a combined cycle plant with a heat recovery steam generator provides the best performance in heat rate and output. Depending on the specific plant conditions, similar results can be achieved with a fully-fired topping arrangement. Utilizing a compound cycle arrangement provides a somewhat lower output and worse heat rate compared to the combined cycle alternative. However, output and heat rate performance of this compound cycle plant can be improved by replacing the LP turbines. The utilization of advanced LP turbine sections provides a heat rate and output improvement in the range of 2 to 3%. With this addition, the performance of the compound cycle plant shows up as a slightly lower output, but better heat rate than the combined cycle with heat recovery steam generator.

In regard to emission discharge the specific emission per generated kWh is reduced to all alternatives because the gas turbine with its hybrid burners provides a low $NO_x$ emission in the range of 25 ppm without steam or water injections. An even larger improvement can be achieved with a fully-fired combined cycle plant since the hot exhaust gas from the gas turbine is used for secondary combustion in the reheat steam generators. At the Eemscentrale plant this concept, in combination with an exchange of the burners in the steam generators, lead to a reduction of the $NO_x$ emission from 400-500 ppm before repowering to 100-150 ppm after the gas turbine was topped onto the existing 600 MW steam plant.

In cases where large relatively new existing steam plants reveal a potential for uprating, the compound cycle application is an attractive option. This eliminates the need for installing anew steam turbine plant with its auxiliary systems like condenser and cooling water supply as well as avoiding a major rebuild of the existing steam generators.

Without modifying the steam turbine flow path, increasing the capacity of existing steam turbines might be limited. When considering replacement of steam turbine sections, the compound cycle concept can generate maximum additional output at a very attractive heat rate level. Since an existing steam plant is utilized, the specific cost for such compound cycle topping can be as low as the expense of building a simple cycle gas turbine plant.

What is claimed is:

1. A compound cycle power plant comprising a gas turbine having a hot gas exit topped onto at least two steam turbine plants, having heat exchange means between the gas turbine and the steam turbine plants, the heat exchange means communicating with the hot gas exit and arranged to pass hot gases exiting the gas turbine in heat exchange with feedwater cycled through said steam turbine plants to preheat said water or convert it to steam.

2. A compound cycle power plant comprising a gas turbine having a hot gas exit topped onto at least two steam turbine plants, having heat exchange means between the gas turbine and the steam turbine plants, the heat exchange means communicating with the hot gas exit and arranged to pass hot gases exiting the gas turbine in heat exchange with feed water cycled through said steam turbine plants to preheat said water or convert it to steam, wherein the heat exchange means comprises at least two separate heat exchangers, each communicating with the hot gas exit and one of each separate heat exchangers communicating with recycle water from one of each respective steam turbine plants.

3. The power plant of claim 2 which further comprises control means for controlling the flow of hot gases from the hot gas exit to the heat exchange means.

4. The power plant of claim 3 wherein the control means comprise a first means for controlling the total amount of hot gas flowing to the heat exchange means and a second means for controlling the flow of hot gases to each respective heat exchanger.

5. The power plant of claim 4 wherein the first and second control means are louver dampers.

6. The power plant of claim 3 which further comprises extraction means for extracting heat from the heat exchanger for heating purposes external of said steam turbine.

7. The power plant of claim 2 wherein two steam turbines are connected to the gas turbine.

8. The power plant of claim 2 wherein the heat exchangers are connected so as to only heat feedwater for the steam turbine plants.

9. The power plant of claim 6 wherein one heat exchanger is connected so as to heat feedwater for one steam turbine plant and the other heat exchanger is connected so as to supplying heat to the heat extraction means.

10. The power plant of claim 4 wherein the heat exchangers is connected so as to provide hot reheat steam to the steam turbine plants.

11. A compound cycle power plant comprising a gas turbine having a hot gas exit topped onto at least two steam turbine plants, having heat exchanger means between the gas turbine and the steam turbine plants, the heat exchanger means comprising at least two separate heat exchangers communicating with the hot gas exit and arranged to pass hot gases exiting the gas turbine in heat exchange with feedwater cycled through said steam turbine plants to preheat said water or convert it to steam.

12. The power plant of claim 11 which further comprises control means for controlling the flow of hot gases from the hot gas exit to the heat exchange means.

13. The power plant of claim 12 wherein the control means comprise a first means for controlling the total amount of hot gas flowing to the heat exchange means and a second means for controlling the flow of hot gases to each respective heat exchanger.

14. The power plant of claim 13 wherein the first and second control means are louver dampers.

15. The power plant of claim 12 which further comprises extraction means for extracting heat from the heat exchanger for heating purposes external of said steam turbine.

16. The power plant of claim 11, wherein two steam turbines are connected to the gas turbine.

17. The power plant of claim 11 wherein the heat exchangers are connected so as to only heat feedwater for the steam turbine plants.

18. The power plant of claim 16 wherein one heat exchanger is connected so as to heat feedwater for one steam turbine plant and the other heat exchanger is connected so as to supplying heat to the heat extraction means.

19. The power plant of claim 13 wherein the heat exchangers are connected so as to provide hot reheat steam to the steam turbine plant.

* * * * *

UNITED STATES PATENT AND TRADEMARK OFFICE
CERTIFICATE OF CORRECTION

PATENT NO. : 5,267,434

DATED : December 7, 1993

INVENTOR(S) : Termuehlen et al.

It is certified that error appears in the above-identified patent and that said Letters Patent is hereby corrected as shown below:

Cover Page, Item (54), and col. 1, line 1,
Delete "TURINE" and in its place insert --TURBINE--.

Signed and Sealed this

Thirtieth Day of August, 1994

Attest:

BRUCE LEHMAN

Attesting Officer

Commissioner of Patents and Trademarks